Oct. 19, 1948.　　　　　E. T. KINDT　　　　　2,451,747
DOWELED STRUCTURE
Filed March 23, 1945

INVENTOR.
ERNEST T. KINDT
BY Richey & Watts
ATTORNEYS

Patented Oct. 19, 1948

2,451,747

UNITED STATES PATENT OFFICE 2,451,747

DOWELED STRUCTURE

Ernest T. Kindt, Lakewood, Ohio

Application March 23, 1945, Serial No. 584,396

2 Claims. (Cl. 22—110)

This invention relates broadly to dowel pins of the type employed in the pattern makers art and more specifically to dowel pins for metal pattern equipment.

One of the objects of the invention is to provide a pilot bearing on an end portion of the pin and the bushing to assure the perpendicularity of the parts relative to the work and/or the axial alignment thereof when mounted in this assembled relation.

Another object of the invention is to provide shouldered heads on the dowel pin and bushing to facilitate the cramped engagement of the threads when the parts are screwed in place and tightened for abutting engagement of the shoulders with their seats.

Another object of the invention is to provide a dowel pin set having flanged heads thereon which are of adequate width and thickness to accommodate the fabrication of the marginal edges thereof for the reception of the tongues of a tool, such as a pin wrench, for screwing the parts into seated engagement with the work.

Further objects of the invention reside in the provision of a dowel pin and bushing which are economic of manufacture, sturdy of structure, efficient of operation and susceptible of assembly with minimum of effort.

Other objects and advantages more or less ancillary to the foregoing and the manner in which all the various objects are realized will appear in the following description, which considered in connection with the accompanying drawings, sets forth the preferred embodiment of the invention.

Referring to the drawings.

Figure 2:
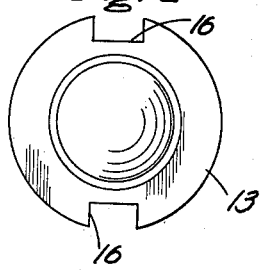
Fig. 2 is an end elevation thereof.
Figure 1:
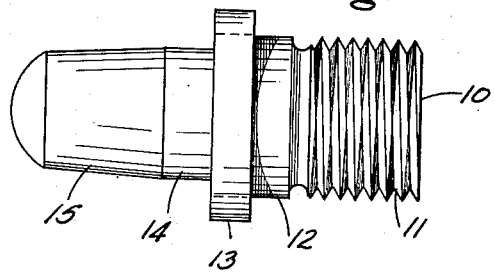
Fig. 1 is a side elevation of the improved dowel pin.
Figure 3:
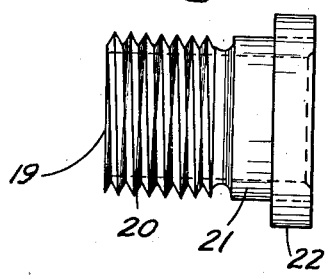
Fig. 3 is a side elevation of the bushing for the reception of the dowel pin illustrated in Fig. 1.
Figure 4:
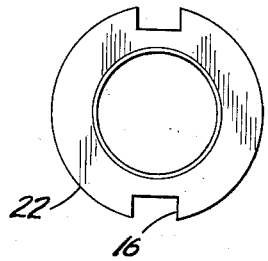
Fig. 4 is an end elevational view thereof.
Figure 5:
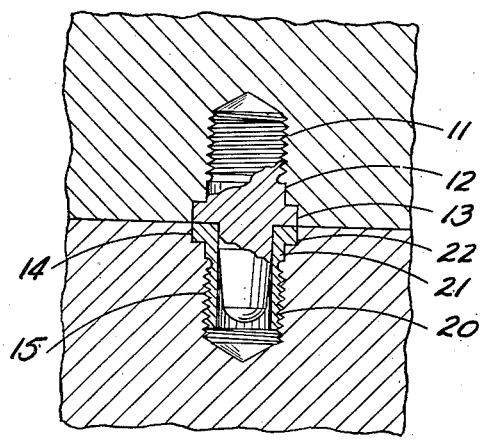
Fig. 5 is a sectional view through fragmentary cope and drag portions of a pattern illustrating the improved dowel pin and bushing in their operative position therein, a portion of the pin, in this figure, being shown in elevation in the interest of clarity.
Figure 6:
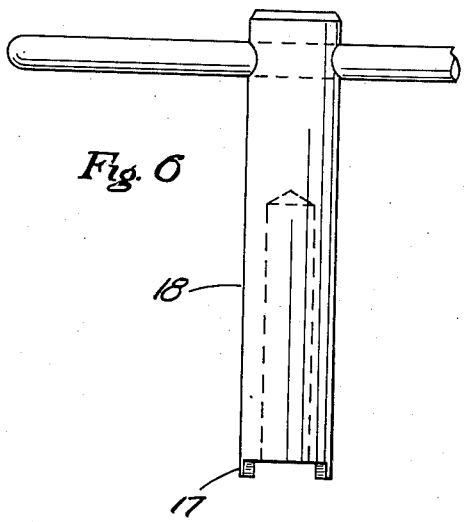
Fig. 6 is an elevational view of the preferred type of wrench for use in setting the dowel members.

Referring first to Fig. 1, the dowel pin comprises a shank 10 embodying a threaded end portion 11, a pilot bearing 12, a flange 13, a bushing bearing 14 and a tapered end portion 15 for guiding the pin into the bushing during the assembly of the pattern parts. The flange 13 is formed with diametrically opposed recesses 16 in the side walls thereof for the reception of the tongues of a wrench such for example as the pins 17 in the end wrench 18 illustrated in Fig. 6. The recesses 16 are preferably machined in the body of the flange with a square cornered milling cutter, though drilled holes for the engagement of cylindrical pins in the wrench could obviously be substituted therefor.

The dowel bushing comprises a shank 19 having a threaded end portion 20 thereon, a pilot bearing 21 and a flange 22 of similar size and configuration as the flange on the dowel pin so that the wrench may be used interchangeably on the two parts. The body of the bushing is bored throughout its length to a diameter which will afford a few thousandths of an inch clearance over the bearing surface 14 in the pin. The throat of the bushing is chamfered to facilitate the ready assembly of the parts of the pattern when the guiding end portion 15 is introduced therein.

In assembly the work is drilled, tapped and counterbored for the reception of the threaded ends of the dowel pin or bushing, the dimensions of the openings adjacent the counterbores being maintained, during the machining operation, to provide for the snug engagement of the pilot bearing 12 or 21 therewith.

The lower faces of the flanges 13 and 22 and the bottom walls of the counterbores in the work are machined square with the pilot bearings 12 and 21; hence, when the pin and bushing are assembled in the work the axes thereof will be disposed in aligned relation with each other irrespective the thread clearance between the dowel parts and the work. The counterbores are machined to a depth equal to the thickness of the flanges so that the end faces thereof will be flush with the work when the dowel parts are mounted therein. The flanges are proportioned to resist the tensive strains imposed thereon when the dowel parts are tightened in place, the thickness thereof being designed to provide an adequate support for the pins 17 of the key or wrench 18.

Although the foregoing description is necessarily of a detailed character, in order that the invention may be completely set forth, it is to be understood that the specific terminology is not intended to be restrictive or confining, and that various rearrangements of parts and modifications of detail may be resorted to without departing from the scope or spirit of the invention as herein claimed.

I claim:

1. In combination, two parts of a divided pattern or the like and two elements of a dowel pin set, the elements comprising a bushing and a pin engaging within the bushing, each element being fitted in one of the parts, each element being formed with a shoulder, a pilot bearing adjacent thereto, and a threaded terminal portion for retention of the element in the part, the part being formed with a bore dimensioned to fit closely the pilot bearing and an abutment for the shoulder, and with threads dimensioned to receive the terminal portion with sufficient clearance to avoid interference by the terminal portion with the alignment of the element in the part.

2. In combination, two parts of a divided pattern or the like and two elements of a dowel pin set, the elements comprising a bushing and a pin engaging within the bushing, each element being fitted in one of the parts, each element being formed with a shoulder, a cylindrical pilot bearing adjacent thereto, and a threaded terminal portion adjacent to the pilot bearing and distinct therefrom for retention of the element in the part, the diameter over the threads of the threaded portion being less than that of the pilot portion, the part being formed with a bore dimensioned to fit the pilot bearing and an abutment for the shoulder, and with threads dimensioned to receive the terminal portion with sufficient clearance to avoid interference by the terminal portion with the alignment of the element in the part, the threads of the element and body being of constant radius.

ERNEST T. KINDT.

REFERENCES CITED

The following references are of record in the file of this patent:

UNITED STATES PATENTS

| Number | Name | Date |
|---|---|---|
| 115,214 | Jones | May 23, 1871 |
| 610,423 | Van Ommeren | Sept. 6, 1898 |
| 679,970 | Keeler | Aug. 6, 1901 |
| 1,455,793 | Kindt | May 22, 1923 |
| 1,749,547 | Ruddy | Mar. 4, 1930 |
| 1,897,196 | Hunt | Feb. 14, 1933 |
| 2,013,488 | Carrier | Sept. 3, 1935 |
| 2,184,449 | Bell | Dec. 26, 1939 |
| 2,221,141 | Kindt | Nov. 12, 1940 |

FOREIGN PATENTS

| Number | Country | Date |
|---|---|---|
| 95,368 | Germany | Dec. 21, 1897 |